(12) United States Patent
Perkinson

(10) Patent No.: US 8,740,565 B2
(45) Date of Patent: Jun. 3, 2014

(54) MODULAR COUNTER ROTATING PROPELLER SYSTEM

(75) Inventor: Robert H. Perkinson, Stonington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 474 days.

(21) Appl. No.: 13/208,648

(22) Filed: Aug. 12, 2011

(65) Prior Publication Data
US 2013/0039764 A1 Feb. 14, 2013

(51) Int. Cl.
F01D 7/00 (2006.01)
B64C 11/48 (2006.01)

(52) U.S. Cl.
USPC .......................................................... 416/129

(58) Field of Classification Search
USPC .......... 416/66, 128, 129, 160; 60/39.162, 268
See application file for complete search history.

(56) References Cited

U.S. PATENT DOCUMENTS

| | | | |
|---|---|---|---|
| 2,531,032 A * | 11/1950 | Desmoulins | 475/248 |
| 2,679,907 A | 6/1954 | Frankland | |
| 2,765,040 A | 10/1956 | Darrah | |
| 4,728,261 A * | 3/1988 | Wright et al. | 416/127 |
| 4,817,382 A * | 4/1989 | Rudolph et al. | 60/268 |
| 5,090,869 A | 2/1992 | Wright | |
| 5,174,718 A | 12/1992 | Lampeter et al. | |
| 5,897,293 A | 4/1999 | Arel et al. | |
| 6,702,631 B2 | 3/2004 | Jordan | |
| 6,821,169 B2 | 11/2004 | Jordan | |
| 2002/0086595 A1 | 7/2002 | Jordan | |
| 2008/0089786 A1 | 4/2008 | Sinreich | |
| 2010/0239421 A1 | 9/2010 | Boston et al. | |
| 2010/0310368 A1 | 12/2010 | Perkinson et al. | |
| 2010/0310369 A1 | 12/2010 | Perkinson et al. | |
| 2011/0311361 A1 * | 12/2011 | Charier et al. | 416/129 |
| 2012/0079808 A1 * | 4/2012 | Glynn et al. | 60/268 |

* cited by examiner

Primary Examiner — Ned Landrum
Assistant Examiner — Liam McDowell
(74) Attorney, Agent, or Firm — Carlson, Gaskey & Olds, P.C.

(57) ABSTRACT

A self-contained counter rotating turbo prop system is driven by a gas turbine engine through a reduction gearbox. A gear train housed separate from the reduction gearbox provides the counter-rotation of a first and second pluralities of propeller blades. The entire counter-rotating propeller system is disposed within cowlings and is separate from the gas turbine engine and reduction gearbox. The example counter rotating propeller system includes a collective blade angle actuation system that provides for adjustment of blade angle of both the first and second plurality of propeller blades with a single actuator.

17 Claims, 3 Drawing Sheets

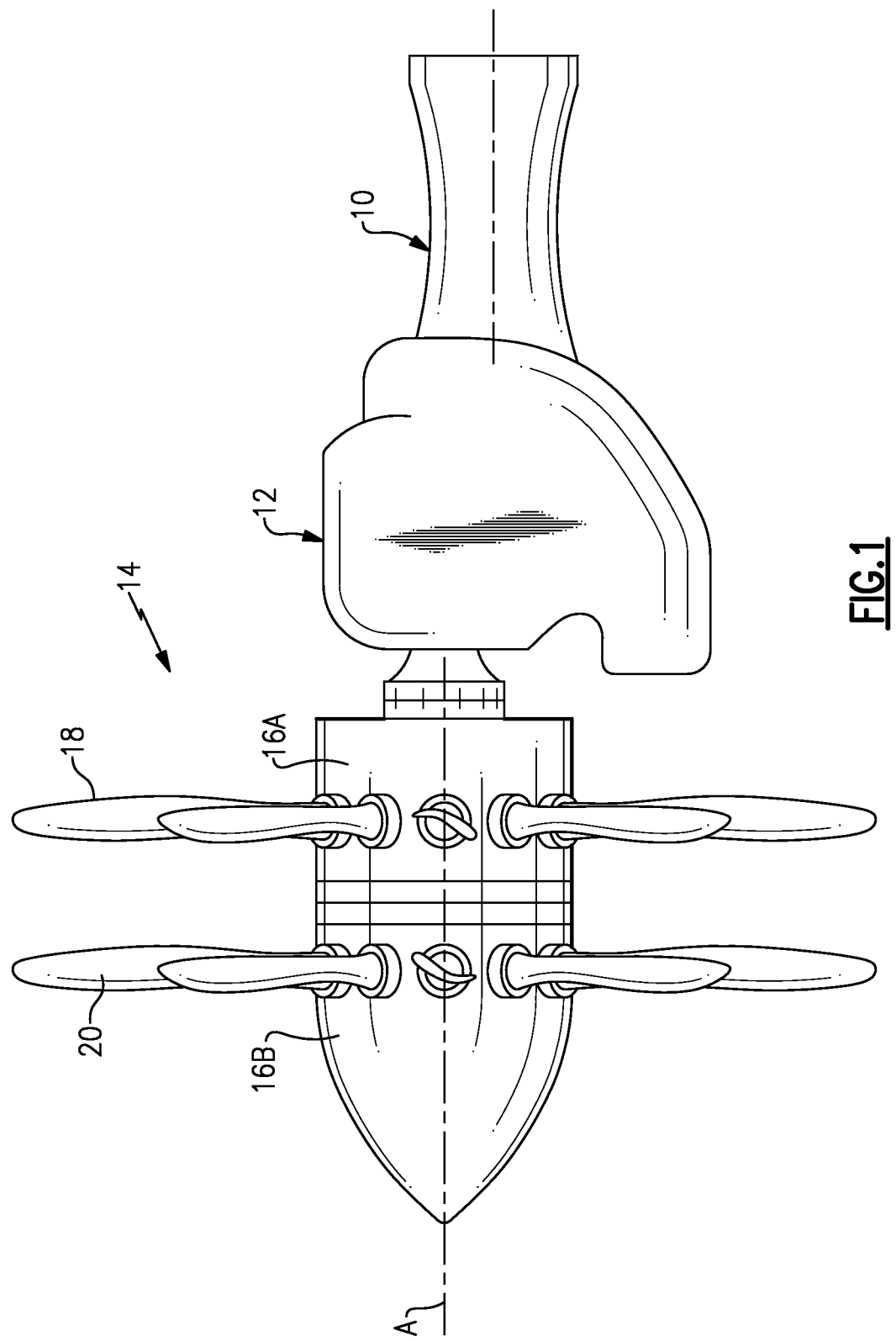

MODULAR COUNTER ROTATING PROPELLER SYSTEM

BACKGROUND

This disclosure generally relates to counter rotating propeller systems. More particularly, this disclosure relates to a self-contained modular counter rotating propeller driven by a single shaft of a main driving engine.

Counter rotating propellers have been considered complicated due to the need to by highly integrated within the engine. Accordingly, engine manufacturers have not taken advantage of the benefits provided by counter rotating propeller systems. Moreover, the relative rotating parts of a counter rotating propeller system increases complexity of variable pitch control and other control structures.

SUMMARY

An example self-contained counter rotating turbo prop system is driven by a gas turbine engine through a reduction gearbox. A gear train housed separate from the reduction gearbox provides the counter-rotation of a first and second pluralities of propeller blades. The entire counter-rotating propeller system is disposed within cowlings and is separate from the gas turbine engine and reduction gearbox.

The example counter rotating propeller system includes a collective blade angle actuation system that provides for adjustment of blade angle of both the first and second plurality of propeller blades. The example collective blade control system includes a single actuator to control blade angle of both the first and second plurality of propeller blades. A translation mechanism is provided for communicating blade angle changes between the first and second plurality of propeller blades.

These and other features disclosed herein can be best understood from the following specification and drawings, the following of which is a brief description.

BRIEF DESCRIPTION OF THE DRAWINGS

FIG. 1 is a schematic representation of an example modular counter rotating propeller system.

DETAILED DESCRIPTION

Figure 3:
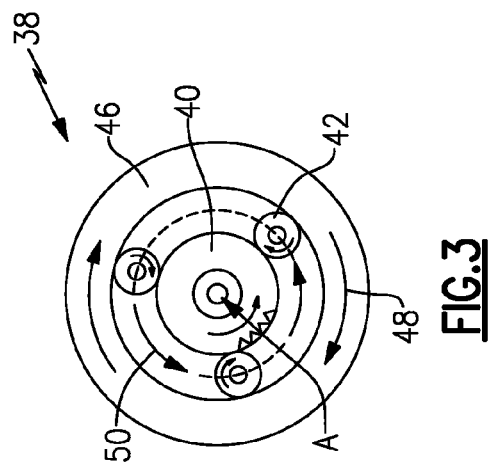
FIG. 3 is a cross-sectional view of an example planetary gear train.

Referring to FIG. 1, an example self-contained counter rotating turbo prop system 14 is driven by a gas turbine engine 10 through a reduction gearbox 12. The counter rotating propeller system 14 drives a first plurality of propeller blades 18 in a first direction about a main axis A and a second plurality of propeller blades 20 in an opposite direction about the same axis A. The propeller system 14 is covered by cowlings (also sometimes referred to as spinners) 16A, 16B. The cowlings 16A and 16B cover a gear train that provides the counter-rotation of the first and second pluralities of propeller blades 18, 20. The entire counter-rotating propeller system 14 is disposed within the cowlings 16a and 16b and is separate from the gas turbine engine 10 and reduction gearbox 12.

The example counter rotating propeller system 14 requires only a single input shaft from the gas turbine engine 10. The desired differential rotation is provided by the gear train enclosed within propeller cowlings 16a and 16b. Differential rotation is provided by the torque split through the gearbox which provides approximately equal but opposite torque to the separate plurality of propeller blades. Moreover, torque split could be non-equally allocated between the first and second plurality of propeller blades 18, 20.

Figure 2:
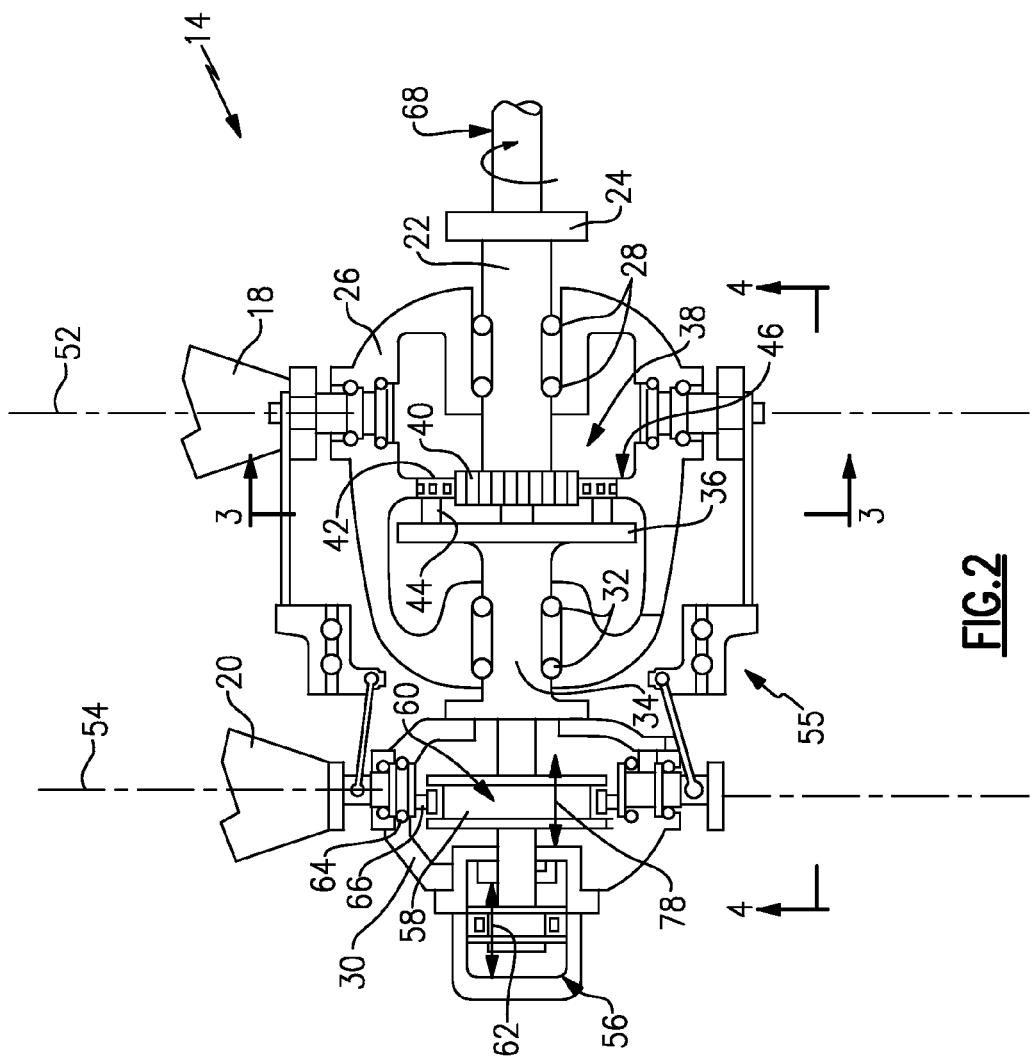
FIG. 2 is a cross-sectional view of the example counter rotating propeller system.

Referring to FIG. 2, the example counter rotating propeller system 14 includes a first hub 26 that supports the first plurality of propeller blades 18 and is supported about a first input shaft 22. The input shaft 22 includes a flange 24 that provides for securing the input shaft 22 to the reduction gearbox 12. No other driving connection is required between the reduction gearbox 12 and the example counter rotating propeller system 14.

The first hub 26 includes bearings 28 that support the hub 26 for rotation about the input shaft 22. The first hub 26 is supported on the input shaft 22 but is rotatable independent of rotation of the input shaft 22. A second input shaft 34 is supported within the first hub 26 by bearings 32 and is rotatable independent of both the first hub 26 and the input shaft 22.

A second hub 30 is attached to the second input shaft 34 and rotates with the second input shaft 34. The first input shaft 22 provides the driving input to a planetary gear train 38. The example planetary gear train 38 includes a sun gear 40 that is mounted to the input shaft 22. Accordingly, the sun gear 40 is driven by the input shaft 22 at the speed of the input shaft 22. Surrounding the sun gear 40 is a plurality of planet gears 42 that are supported on a planet carrier 44. The planet carrier 44 is in turn supported by a flange 36 of the second input shaft 34. The planet gears 42 in turn drive a ring gear 46. The ring gear 46 is defined on an inner surface of the first hub 26. The ring gear 46 drives rotation of the first hub 26.

Referring to FIG. 3 with continued reference to FIG. 2, the planetary gear train 38 operates by driving the sun gear 40 by the first input shaft 22. The sun gear 40 drives the planet gears 42 through the meshing engagement there between. Because the planet gears 42 are supported by the planet carrier 44 mounted to the second input shaft 34, the second input shaft 34 will rotate in a direction indicated by arrow 50 common with rotation of the input shaft 22. The planet gears 42 themselves rotate in a direction opposite that of the sun gear 40 and translate that motion to the ring gear 46. The translated motion to the ring gear 46 will result in the first hub 26 rotating in a direction indicated by arrow 48 about the axis A. The second input shaft 34 will rotate in the direction indicated by arrow 50 about the sun gear 40 and thereby drive the second hub 30 in a direction opposite that of the first hub 26 about the axis A.

The example planetary gear train 38 is comprised of components of the first hub and the second input shaft 34. Accordingly, the planetary gear train 38 is housed entirely within the modular propeller system 14 and does not require additional modification or mechanisms within the reduction gearbox 12 that is driven by the gas turbine engine 10.

A pitch angle of each of the first and second plurality of propeller blades 18 and 20 is variable to optimize performance. Changes in pitch angles of the second plurality of propeller blades are made in concert with changes in the first plurality of propeller blades 18.

In this example, the first plurality of propeller blades 18 is supported within the first hub 26 by a first cam plate 96. The first cam plate 96 is supported by bearings that allow rotation of each of the plurality of propeller blades 18 about an axis 52. The axis 52 is transverse to the axis A about which the first hub 26 rotates. The second plurality of propeller blades 20 is also rotatable about an axis 54 that is transverse to the axis of rotation A.

The example counter rotating propeller system 14 includes a collective blade angle actuation system 55 that provides for adjustment of blade angle of both the first and second plurality of propeller blades 18, 20. The example collective blade control system 55 includes a single actuator 56 to control blade angle of both the first and second plurality of propeller blades 18, 20. The actuator 56 is disposed within and mounted within the second hub 30. The actuator 56 is hydraulic and receives hydraulic pressure through a transfer tube 68. Both the first input shaft 22 and the second input shaft 34 comprises hollow structures that allow the transfer tube 68 to extend from the reduction gearbox 12 through both the first and second hubs 26, 30 to the actuator 56 that is disposed at a forward most end on the propeller system 14. As appreciated, although a hydraulic actuator is shown, other actuators such as an electric actuator are also within the contemplation of this invention.

Figure 4:
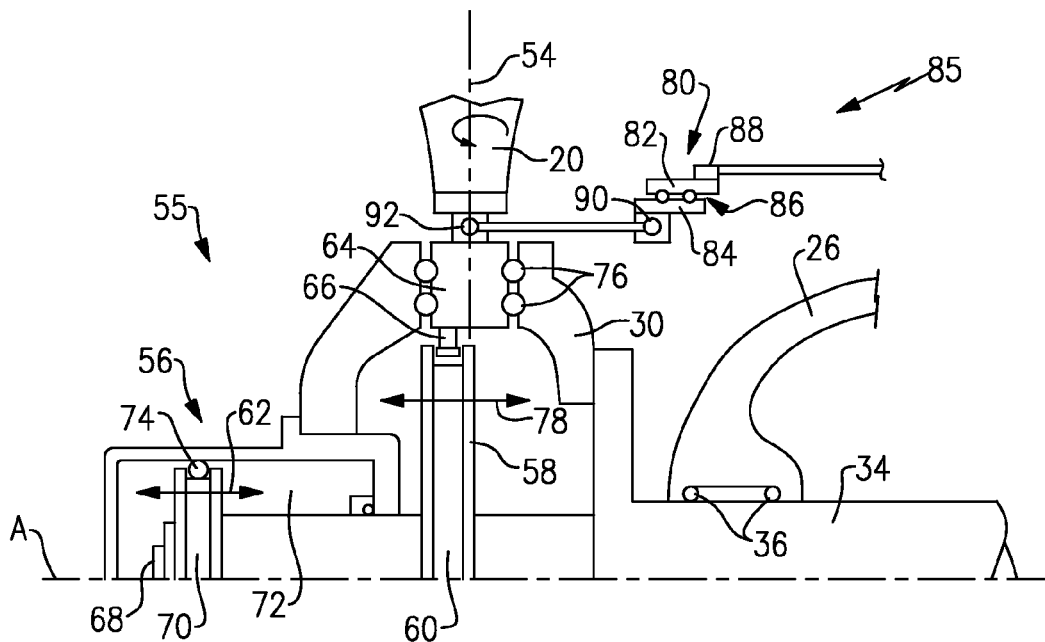
FIG. 4 is a sectional view of a portion of the counter rotating propeller system.

Referring to FIG. 4 with continued reference to FIG. 2, the example actuator 56 includes a piston 70 that moves axially as indicated by arrows 62 within a piston chamber 72. The piston 70 includes a seal 74 such that hydraulic pressure communicated by the transfer tube 68 causes a corresponding axial movement of the piston 70. The piston 70 drives a yoke plate 58 along the axis A. The yoke plate 58 includes a groove 60 for a guide pin 66.

The guide pin 66 fits within the groove 60 of the yoke plate 58. The guide pin 66 is offset from the axis 54 about which the propeller blades 20 rotate. This offset distance from the axis 54 provides for axial movement of the yoke plate 58 to be translated into rotational movement about the axis 54 of the propeller blade 20. The guide pin 66 is attached to cam plate 64 and the cam plate 64 is supported by bearings 76 for rotation about the axis 54. The offset mounting of the guide pin 66 provides for the desired rotation of the propeller 20 about their respective axis 54 while the interface between the guide pin 66 and groove 60 allows for relative motion as a result of the rotary movement of the pin 66 about the axis 54.

Axial movement indicated by arrow 78 of the yoke plate 58 results in the desired rotation or pitch alteration of the propeller blades 20. The yoke plate 58 provides only for the pitch blade angle alteration of a second plurality of blades 20. However, the first plurality of blades 18 also must be comparably adjusted. As the first plurality blades 18 are rotating in a direction opposite from the second plurality of blades 20, adjustment of the blade angle is desired to be in an opposite direction. A translation mechanism 85 is included in the example propeller system 14. The translation mechanism 85 includes a bearing 80 that includes a first side 82 and a second side 84. Between the first side 82 and the second side 84 are a plurality of thrust bearings 86 that translate axial motion between a first cam arm 92 and a second arm 94. The first and second sides 82, 84 are concentric rotating rings that rotate relative to each other in opposite directions about the axis A.

Figure 5:
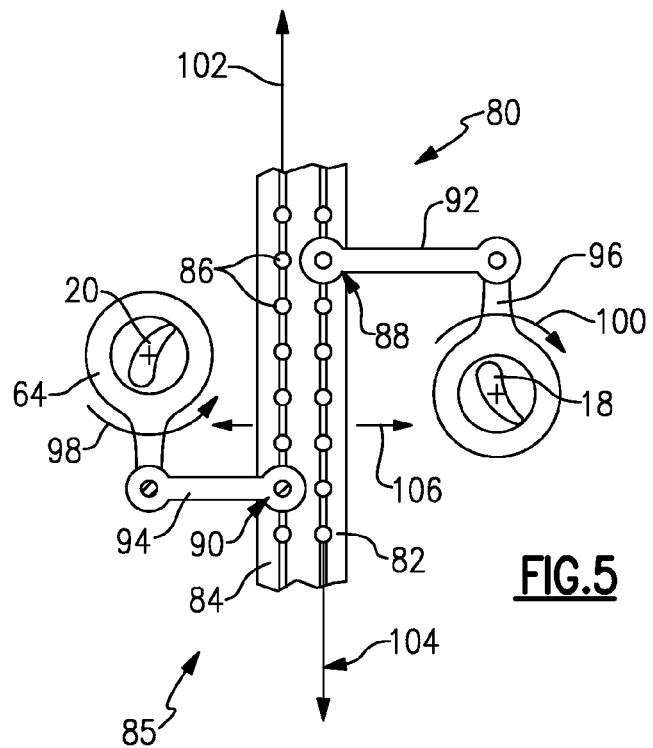
FIG. 5 is a cross-sectional view of a translation system for controlling propeller pitch in the example counter rotating propeller system.

Referring to FIG. 5 with continued reference to FIG. 4, the translation mechanism 85 includes the bearing 80 that is pivotally attached to a first cam arm 92 and to a second cam arm 94. Axial movement of the bearing 80 in a direction indicated by arrows 106 will result in a comparable rotation of each of the corresponding pluralities of propeller blades 18, 20. The second plurality of propeller blades 20 is supported on the cam plate 64. The cam plate 64 is rotated in response to movement of the yoke 58. This movement is communicated through the second cam arm 94 and pivot 90 to the bearing 80. The bearing 80 moves axial in response to movement of the second cam arm 94.

Movement of the bearing 80 is transferred through the thrust bearings 86 and pivot 88 to the first cam arm 92. The first cam arm 92 is pivotally attached to the bearing 80 at the pivot 88 on one end and to a cam plate 96 that supports rotation of the first plurality of propeller blades 18. The thrust bearings 86 allow for relative rotation about the axis A in opposite directions as indicated by arrows 102 and 104. Accordingly, the bearing 80 provides for the relative rotation between the first side 82 and the second side 84 while also providing for translation of axial motion in the direction of arrows 106.

As should be appreciated, although the cam arms 94 and 92 are shown to be substantially equal in the example illustrations. The cam arms 92 and 94 can be of any lengths desired to provide a corresponding movement between the first and second pluralities of propeller blades 18, 20. In other words, in some instances, it may be desirable to adjust the propeller blades on the first and second hubs in a corresponding but not equal manner. Such movements can be provided by adjusting a length of each of the first and second cam arms 92, 94 and may also be adjusted and varied by specific configuration of the cam plates 96 and 64. In this example, rotation in the direction indicated by 98 of the second plurality of propeller blades 20 results in a corresponding but opposite rotation in a direction indicated by arrow 100 of the first plurality of propeller blades 18.

The example collective blade angle actuation system 55 provides for a single input to be utilized to adjust a desired pitch of both the first and second plurality of counter rotating propeller blades 18, 20. The single input required to adjust both the first and second plurality of propeller blades 18, 20 provides for the modular propeller system to be mounted onto existing turbo prop engine platforms without addition mechanisms or extensive modifications. In other words, a single control output as is provided by the transfer tube 68 can be utilized to actuate and adjust the blade angle of both the first and second plurality of counter rotating blades.

Accordingly, the example counter rotating propeller system 14 provides a self-contained system that does not require modification to existing gearbox or engine configurations. The example propeller system 14 can essentially be bolted to an existing turbo prop engine that utilizes only a single plurality of propellers and utilize existing control features such as the transfer tube 68 to control the pitch angle of both pluralities of blades. Moreover, no additional modifications are required to an existing gearbox to facilitate the desired counter-rotation. The planetary gear train 38 can be modified to provide a variation in the torque applied to each of the first and second plurality of blades 18, 20. The planetary gear train 38 can be modified to divide torque in a desired manner such that each of the counter rotating blades contributes a differing amount of torque and thrust.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A counter rotating propeller system comprising:
   a first input shaft rotatable about an axis and driven by a main engine;

a first hub supporting a first plurality of propeller blades, the first hub supported for rotation directly by the first input shaft such that the first hub is rotatable relative to the first input shaft;

a second input shaft supported by the first hub for rotation relative to the first hub and the first input shaft;

a second hub supporting a second plurality of propeller blades, the second hub supported by the second input shaft; and a planetary gear train driven by the first input shaft, the planetary gear train including a sun gear attached for rotation with the first input shaft, at least one planet gear supported on a planet gear carrier attached to the second input shaft, and a ring gear defined by the first hub, wherein the planetary gear train drives the first hub in a first direction and the second hub in a second direction opposite the first direction.

2. The counter rotating propeller system as recited in claim 1, wherein the first hub includes an inner surface defining the ring gear.

3. The counter rotating propeller system as recited in claim 1, including an actuator disposed within the second hub for adjusting a pitch of the first and second pluralities of propeller blades.

4. The counter rotating propeller system as recited in claim 3, wherein the first input shaft and the second input shaft comprise hollow shafts and a transfer tube extends through each of the first and second input shafts to the actuator within the second hub.

5. The counter rotating propeller system as recited in claim 4, including a yoke plate moveable axially responsive to the actuator and a plurality of cam plates attached to corresponding ones of the second plurality of propeller blades for rotation of the second plurality of propeller blades responsive to axial movement of the yoke plate.

6. The counter rotating propeller system as recited in claim 5, wherein the actuator comprises a hydraulic actuator and the transfer tube communicates hydraulic pressure to the actuator for moving the yoke plate axially.

7. The counter rotating propeller system as recited in claim 5, including a transfer mechanism translating rotation of the second plurality of propellers blades to the first plurality of propeller blades.

8. The counter rotating propeller system as recited in claim 7, wherein the transfer mechanism includes a first cam arm extending from the first plurality of propeller blades to a bearing and a second cam arm extending from the second plurality of propeller blades to the bearing.

9. The counter rotating propeller system as recited in claim 8, wherein the bearing includes a plurality of thrust bearings disposed between a first ring and a second ring movable relative to each other with the bearing movable axially.

10. The counter rotating propeller system as recited in claim 9, wherein the transfer mechanism rotates the first plurality of propeller blades in a first direction and the second plurality of blades in a second direction opposite the first direction to adjust a corresponding pitch angle for each of the first and second pluralities of propeller blades.

11. A counter rotating propeller system comprising:
a first input shaft rotatable about an axis and driven by a main engine;
a first hub supporting a first plurality of propeller blades, the first hub supported for rotation directly by the first input shaft such that the first hub is rotatable relative to the first input shaft;
a second input shaft supported by the first hub for rotation relative to the first hub and the first input shaft;
a second hub supporting a second plurality of propeller blades, the second hub supported by the second input shaft;
a planetary gear train driven by the first input shaft for driving the first hub in a first direction and the second hub in a second direction opposite the first direction;
an actuator for adjusting an angle of the first and second pluralities of propeller blades disposed within the second hub, the actuator driving a yoke plate axially that in turn rotates each of the second plurality of blades; and
a transfer mechanism translating rotation of the second plurality of blades to the first plurality of blades.

12. The counter rotating propeller system as recited in claim 11, wherein the first input shaft and the second input shaft comprise hollow shafts and a transfer tube extends through each of the first and second input shafts to the actuator within the second hub.

13. The counter rotating propeller system as recited in claim 11, including a plurality of cam plates attached to corresponding ones of the second plurality of propeller blades for rotation of the second plurality of propeller blades responsive to axial movement of the yoke plate.

14. The counter rotating propeller system as recited in claim 12, wherein the actuator comprises a hydraulic actuator and the transfer tube communicates hydraulic pressure to the actuator for moving the yoke plate axially.

15. The counter rotating propeller system as recited in claim 11, wherein the transfer mechanism includes a first cam arm extending from the first plurality of propeller blades to a bearing and a second cam arm extending from the second plurality of propeller blades to the bearing, the bearing movable along the axis.

16. The counter rotating propeller system as recited in claim 15, wherein the bearing includes a plurality of thrust bearings disposed between a first ring and a second ring rotatable relative to each other about the axis.

17. The counter rotating propeller system as recited in claim 11, wherein the transfer mechanism rotates the first plurality of propeller blades in a first direction and the second plurality of blades in a second direction opposite the first direction to adjust a corresponding pitch angle for each of the first and second pluralities of propeller blades.

* * * * *